United States Patent [19]
Burch et al.

[11] Patent Number: 5,680,422
[45] Date of Patent: Oct. 21, 1997

[54] METHOD AND APPARATUS FOR REDUCING WAITING TIME JITTER IN PULSE STUFFING SYNCHRONIZED DIGITAL COMMUNICATIONS

[75] Inventors: Richard A. Burch, Madison; Kevin W. Schneider, Huntsville; Michael D. Turner, Madison; Timothy D. Rochell, Elkmont, all of Ala.

[73] Assignee: Adtran, Huntsville, Ala.

[21] Appl. No.: 429,951

[22] Filed: Apr. 27, 1995

[51] Int. Cl.[6] .............................. H04L 7/00; H04J 3/07
[52] U.S. Cl. .................. 375/371; 370/102; 370/105.3
[58] Field of Search ............................ 375/371, 372, 375/363, 376, 359; 370/102, 100.1, 101, 111, 105.3; 327/141, 156

[56] References Cited

U.S. PATENT DOCUMENTS

| | | | |
|---|---|---|---|
| 3,742,145 | 6/1973 | Clark et al. | 370/102 |
| 3,873,773 | 3/1975 | Guy, Jr. | 370/102 |
| 3,961,136 | 6/1976 | Cohen et al. | 375/363 |
| 4,049,053 | 9/1977 | Duttweiler et al. | 370/102 |
| 4,049,910 | 9/1977 | Jolivet et al. | 370/102 |
| 4,107,469 | 8/1978 | Jenkins | 370/102 |
| 4,224,473 | 9/1980 | Kaul et al. | 370/102 |
| 4,471,480 | 9/1984 | Haussmann | 370/84 |
| 4,791,652 | 12/1988 | McEachern et al. | 370/102 |
| 4,811,340 | 3/1989 | McEachern et al. | 370/102 |
| 5,131,013 | 7/1992 | Choi | 375/372 |
| 5,241,543 | 8/1993 | Amada et al. | 370/102 |
| 5,263,056 | 11/1993 | Urbansky | 370/102 |
| 5,263,057 | 11/1993 | Nawrocki et al. | 375/372 |

*Primary Examiner*—Tesfaldet Bocure
*Attorney, Agent, or Firm*—Charles E. Wands

[57] ABSTRACT

A wander reduction mechanism in an HDSL pulse-stuffing synchronization system provides a more precise measure of the phase of the incoming asynchronous signal than is obtained in conventional schemes, in which the only information available is the presence or absence of stuffing pulses. An auxiliary phase comparator and phase adjuster are incorporated into the synchronizer-multiplexer to generate a reference data clock (derived from the synchronized data clock), so that the incoming unsynchronized data clock can be tracked. As the clock is iteratively phase-adjusted, the respective changes are accumulated. At the end of a prescribed measurement interval, the net contents of the accumulator are encoded and transported over the synchronous digital data communication channel to the receiver. By decoding this sequence information, the desynchronizer is able to generate a desynchronized data clock having the same number of net phase adjustments during a measurement period as the reference clock at the synchronizer.

31 Claims, 8 Drawing Sheets

5,680,422

1

METHOD AND APPARATUS FOR REDUCING WAITING TIME JITTER IN PULSE STUFFING SYNCHRONIZED DIGITAL COMMUNICATIONS

FIELD OF THE INVENTION

The present invention relates in general to digital data communication systems and, more particularly, to an apparatus for reducing the amount of waiting time jitter generated by a pulse stuffing synchronization mechanism.

BACKGROUND OF THE INVENTION

Pulse stuffing synchronization, which involves the selective insertion of pulses into a digital data frame being transported over a synchronous digital data channel, is used to maintain clock synchronization in a digital data communication system, where a digital data signal is to be transported over a synchronous digital data channel using a clock that is not bit-synchronous with the digital data signal to be transported. One example where pulse stuffing synchronization is employed is in a multiplexing environment, such as that diagrammatically illustrated in FIG. 1.

In the exemplary system of FIG. 1, at a transmit site 10, a respective unsynchronized digital data signal 201 is input to a pulse stuffing synchronizer 202, which synchronizes the asynchronous digital data signal 201 to a data clock signal 204 provided by a multiplexer 205. The resulting synchronized data signals, of which signal 203 is representative, and optionally some other data 206 which may consist of synchronization information and overhead information used for monitoring and maintenance purposes, for example, are combined by the multiplexer 205 to form a synchronized digital data output signal stream 207 over a synchronous digital data communication channel 20 linking a 'west' (transmitting) site 10 with an 'east' (receiving) site 12.

At the receiving site 12, the synchronized digital data stream 207 is delivered to a demultiplexer 208, which separates or demultiplexes the combined synchronized signal stream 207 into respective synchronized digital data channel signals, of which 210 is representative, as well as the optional other data 209. For each of its output channels, demultiplexer 208 also provides a clock signal 211 to respective pulse stuffing desynchronizers 212. Each pulse stuffing desynchronizer 212 removes any stuffing pulses that may have been inserted at the transmit site and provides a desynchronized signal 213 as its output.

FIG. 2 diagrammatically illustrates a full-duplex multiplex digital data communication system employing pulse stuffing synchronization-desynchronization to transport an unsynchronized signal in each direction over a synchronized communication channel 28 between west site 11 and east site 12. In the illustrated system, unsynchronized, to be transmitted, digital data signals 21 and 36 and other data 22 and 37 are synchronized and multiplexed by pulse stuffing synchronizer-multiplexers 23 and 38, at the respective west and east sites. As in the system of FIG. 1, the other data may consist of synchronization and overhead information used for maintenance and monitoring.

The resulting synchronized signals 24 and 32 are delivered to demultiplexer-desynchronizers 33 and 39, by way of a digital communication channel, which includes a transceiver 26 at the west end of the system, synchronized digital data communication channel 28, and transceiver 30 at the east end of the system. Received synchronized signals 31 and 25 are demultiplexed and desynchronized by demultiplexer-desynchronizer units 33 and 39, providing demultiplexed signals 34 and 40 and other data signals 35 and 41.

2

The unsynchronized signals 21 and 36 are only restricted in data rate and frequency; there is no prescribed phase relationship between them. The synchronized signals 24, 25, 31, and 32 are bit-synchronous; the signal clocks in each direction are synchronized to each other. The transceivers 26 and 30 include all necessary circuitry to transmit and receive data over channel 28, and to receive and send data to the multiplexers 23 and 38 and demultiplexers 33 and 39. The transceivers 26 and 30 may modulate the data; in such a case, the data signals across the channels 27 and 29 may have a baud rate that has a prescribed relationship to the bit rate of signals 24, 25, 31 and 32. Each transceiver may also split the signal and transport it over several physical connections and recombine them in the receiver portion of the transceiver. Channel 28 may comprise any medium capable of transporting the signals, including, but not limited to, one or more twisted pairs of copper wire. Channel 28 will typically degrade the signal due to interference, resulting in occasional bit errors in the received synchronized signals 25 and 32.

FIG. 3 diagrammatically illustrates the configuration of a respective one of the synchronizer-multiplexers 23 and 38 of FIG. 2, wherein an unsynchronized data signal 51 (corresponding to input data signals 21 and 36 of FIG. 2) is input to both a timing extractor 52 and an elastic store 55. Timing extractor 52 produces a write clock 54 which is used to write the data signal 51 into elastic store 55. Optionally, a frame sync signal 53 may be produced by the timing extractor. The frame sync signal 53 is employed when the data signal 51 is framed, and it is desired to keep a prescribed phase relationship between the framing of signal 51 and a stuffing frame of a synchronized output data signal 62. If frame sync signal 53 is used, the elastic store 55 is a frame aligned elastic store.

A synchronized data signal 57 is read out of the elastic store 55 using read clock 59. The read clock 59 and the write clock 54 are input to a phase comparator 56, which provides a binary output 60 to a control logic unit 65. Control logic unit 65 receives the output of phase comparator 60, a synchronized clock 63 produced by a clock generator 64, and optionally, a delayed frame sync signal 58 from the frame aligned elastic store 55, and generates a control signal 66 to multiplexer 61. (It should be noted that there is only one synchronized clock per system (corresponding to synchronized clock 63) and, thus, one clock generator (corresponding to clock generator 64), which is shared by all of the synchronizers in the system.)

In accordance with the control signal 66, multiplexer 66 switches the data line 62 between the synchronized data signal 57, the other data signal 72, and the stuffing pulse data signal 68; it also switches the synchronized clock 63 to the respective read clocks 59, 71, and 69, in order to read the selected data signal.

The 'other data' unit 70 represents memory used to store synchronization, maintenance, monitoring, and other various data that is incorporated into the synchronized data output stream 62. The stuffing pulses unit 67 represents memory that is used to store the values of the stuffing pulses. Control logic unit 65 directs multiplexer 61 to switch between the synchronized data signal 57 and the other data signal 72, based on a predefined stuffing frame format. The predefined stuffing frame has an opportunity for a predetermined number of stuffing pulses to be inserted every stuffing frame, based on the sampled value of the phase comparator output 60.

FIG. 4 diagrammatically illustrates the configuration of a respective one of demultiplexer-desynchronizers 33 and 39 of FIG. 2, wherein a synchronized signal 81 (corresponding to signals 25 and 31 in FIG. 2) is input to a timing/sync extractor 82 and demultiplexer 85. The timing/sync extractor 82 derives a synchronized clock 84 and supplies the clock 84 to control logic unit 86 and to demultiplexer 85. It also provides a stuffing frame sync (synchronization) signal 83 to control logic unit 86. Similar to the control logic unit in the multiplexer-synchronizer, control logic unit 86 employs the synchronized clock 84 to provide a control signal 87 to the demultiplexer 85.

In particular, control signal 87 directs the demultiplexer 85 to switch the incoming data 81 and clock 84 lines between one of three possible outputs: 1—the synchronized data signal 88 and its associated write clock 89, 2—the other data signal 103 and its associated write clock 102, and 3—the stuffing pulses data signal 101 and its associated write clock 100. The synchronized data signal 88 is written into elastic store 90 using write clock 89. Conversely, the desynchronized signal 92 is read out of elastic store 90 using the read clock 93. The write clock 89 and read clock 93 are supplied to a phase comparator 91, which outputs a phase error signal 94. The phase error signal 94 is filtered by a filter 95 and the resulting filtered error signal 96 is coupled as an input to a voltage controlled oscillator (VCO) 97. VCO 97 generates the read clock 93, the frequency of which varies with the (voltage) amplitude of the filtered error signal 96. In addition to filtering out gaps in the write clock 89 due to the presence of stuffing pulses 98, the filter 95 is also operative to filter out gaps in the write clock 89 due to the addition of other data 99 into the predetermined stuffing frame format.

A slightly modified version of the demultiplexer-desynchronizer of FIG. 4 is diagrammatically illustrated in FIG. 5. Its operation is similar to that of FIG. 4, but it also includes a clock generator 108, that produces a clock 104 in which gaps due to the other data 99 of the predefined stuffing frame format have been removed. Instead, the generated clock 104 takes on one of two frequencies every stuffing frame. The particular frequency chosen is determined by control lead 105 from control logic unit 107. Control lead 105 indicates whether or not the last stuffing frame included stuffing pulses. If the frame included stuffing pulses, the clock frequency on clock link 104 for the next frame is $f_A$, where $f_A = P/(Q+R) \times f_H$; if the stuffing frame did not include stuffing pulses, the clock frequency for the next frame is $f_B$, where $f_B = P/(Q-R) \times f_H$.

Although the basic synchronization mechanism achieved by pulse stuffing is to maintain clock synchronization, as described in an article by D. L. Duttweiler, entitled: "Waiting Time Jitter," Bell System Technical Journal, January 1972, pp. 165–207, the data clock produced at the output of a pulse-stuffing synchronizer contains low frequency jitter, termed waiting time jitter, that cannot be removed. Since this jitter occurs at an arbitrarily low frequency, determined by the relative frequencies of clock signals involved, and is often time varying, it cannot be removed using standard filtering techniques, such as a phase locked loop.

As described in an article by Yoshihisa Matsurra, et al, entitled: "Jitter Characteristics of Pulse Stuffing Synchronization," IEEE ICC Conference Proceedings, June 1968, pp. 259–264, and an article by Seiichiro Kozuka, entitled: "Phase Controlled Oscillator for Pulse Stuffing Synchronization System," Review of the Electrical Communication Laboratory, Vol. 17, No. 5, May–June 1969, pp. 376–387, when the pulse stuffing ratio is near a fractional ratio that has a small denominator, the resulting jitter will be that having the largest amplitude.

In particular, when the pulse stuffing ratio is near a ratio of q/p stuffs per stuffing opportunity, the low frequency component of the jitter has an amplitude of 1/p times the size of the stuffing pulse. As an example, if the stuffing ratio is near 1/2 stuffs per stuffing opportunity, this jitter has a peak-to-peak amplitude of 1/2 of the size of the stuffing pulse.

Because, large amplitude jitter can pose problems in communication systems, limits are placed on the maximum allowed jitter. Such limits often split the low and high frequency jitter; high-frequency jitter is often simply termed 'jitter', and low frequency jitter—that which has a frequency of less than 10 Hz—is termed 'wander'.

One example of limits placed on jitter and wander is in the case of DS1 (1.544 Mb/s) signals. For example, ITU-T (CCITT) Recommendation G.824 specifies the maximum allowable jitter for a DS1 signal. ANSI T1.403-1989 specifies limits on the maximum peak-to-peak wander and jitter in a 15 minute interval to be 5 unit intervals (UI). In addition to these limits, ANSI T1.101-1993 specifies limits on the wander of DS1 signals that are used to pass timing information. These limits are in terms of maximum time interval error (MTIE), and vary from 300 to 1000 ns over observation intervals of 1 to 1000 seconds.

One technique for transporting a DS1 signal over twisted-pair wires is known as high-bit-rate digital subscriber line (HDSL). HDSL uses pulse-stuffing synchronization to transport a DS1 signal asynchronously to the signal transport mechanism (the synchronized signal), which is timed via the HDSL master oscillator. The stuffing pulses used in HDSL are approximately 5100 ns long, which is nearly 8 UI of the DS1 signal. The nominal stuffing ratio for HDSL is 1/2, so the wander may be as large as 4 UI, which is approximately 2550 ns. In order to enable an HDSL system to comply with existing requirements for allowed wander, the pulse-stuffing synchronization it employs must include a wander reduction mechanism.

SUMMARY OF THE INVENTION

In accordance with the present invention, this need to include a wander reduction mechanism in an HDSL pulse-stuffing synchronization system is satisfied by transmitting a more precise measure of the phase of the incoming asynchronous signal than is obtained in conventional schemes described above, in which the only information available is the presence or absence of stuffing pulses. Pursuant to a preferred embodiment of the invention, the precise measure of the phase is transmitted by using the values of the stuffing pulses to convey the needed information. As will be described in detail below, the mechanism of the present invention is implemented through a storage and playback technique, which operates essentially as follows.

At the synchronizer/transmitter, a phase comparator and phase adjuster are used to generate a reference data clock, derived from the synchronized data clock, which tracks the incoming unsynchronized data clock. As successive phase adjustments to the clock are made, the respective changes are coupled to a phase adjustment accumulator, which stores the net effect of the phase adjustments over a prescribed measurement period. At the end of the measurement period, the contents of the phase adjustment accumulator are encoded and transported over the synchronous digital data communication channel to the receiver. At the receiver, the encoded message is decoded, and the sequence accumulation information is used by the desynchronizer to generate a desynchronized data clock, that has the same number of net phase adjustments during a measurement period as the reference clock at the synchronizer.

To achieve reduced jitter and wander, the magnitude of each phase step of the phase adjuster must be small compared to the size of the stuffing pulse. In accordance with a preferred embodiment of the invention, the step size of the phase adjuster is 1/N1 of the stuffing pulse. For an HDSL application, N1 may equal 64, for example. This step size will hereinafter be referred to as a 'mini-stuff'. The phase adjuster outputs a reference clock, by advancing or retarding the phase of an input nominal data clock by one mini-stuff every cycle of its operation. Thus, it operates at a rate of N1 times per stuffing opportunity.

The time between stuffing opportunities will be referred to as a stuffing frame, and the time between 'mini-stuff' phase adjustment opportunities will be referred to as a mini-frame. The phase adjustment steps have one of the values of +1 and −1, and represent a phase advancement or retardation by one mini-stuff. During a measurement period, as these step values are generated, they are accumulated by the phase adjustment accumulator. Once per measurement interval, the (running total) contents of the phase adjustment accumulator, termed an accumulated phase word (APW) is retrieved, and the accumulator is reset. The measurement period, termed an M-frame, spans N2 frames, where N2=36, for example. During the subsequent M-frame, the retrieved APW is transmitted to the receiver.

For this purpose, the APW may be encoded and the resulting message transmitted using N3 stuffing pulses that will be transmitted during the M-frame, where N3 corresponds to a minimum number of stuffing pulses present in the N2 stuffing opportunities of the M-frame. N3 may be equal to N2/3, for example. This technique can be used if the allowed ranges of frequencies for the unsynchronized data clock and the synchronized data clock do not use up the entirety of the available stuffing ratio range. If the entire stuffing ratio range is not used, the minimum number N3 of stuffing pulses will be present in the N2 stuffing opportunities of the M-frame. If N3 is not large enough to provide the required data transfer, the APW may be transmitted using some other technique, such as an overhead channel. At the receiver, the transmitted message is decoded (if necessary), and the resulting APW is used by the desynchronizer to generate a desynchronized data clock signal having the same net number of phase adjustments per M-frame as the reference clock generated at the transmitter.

DETAILED DESCRIPTION

Figure 1:
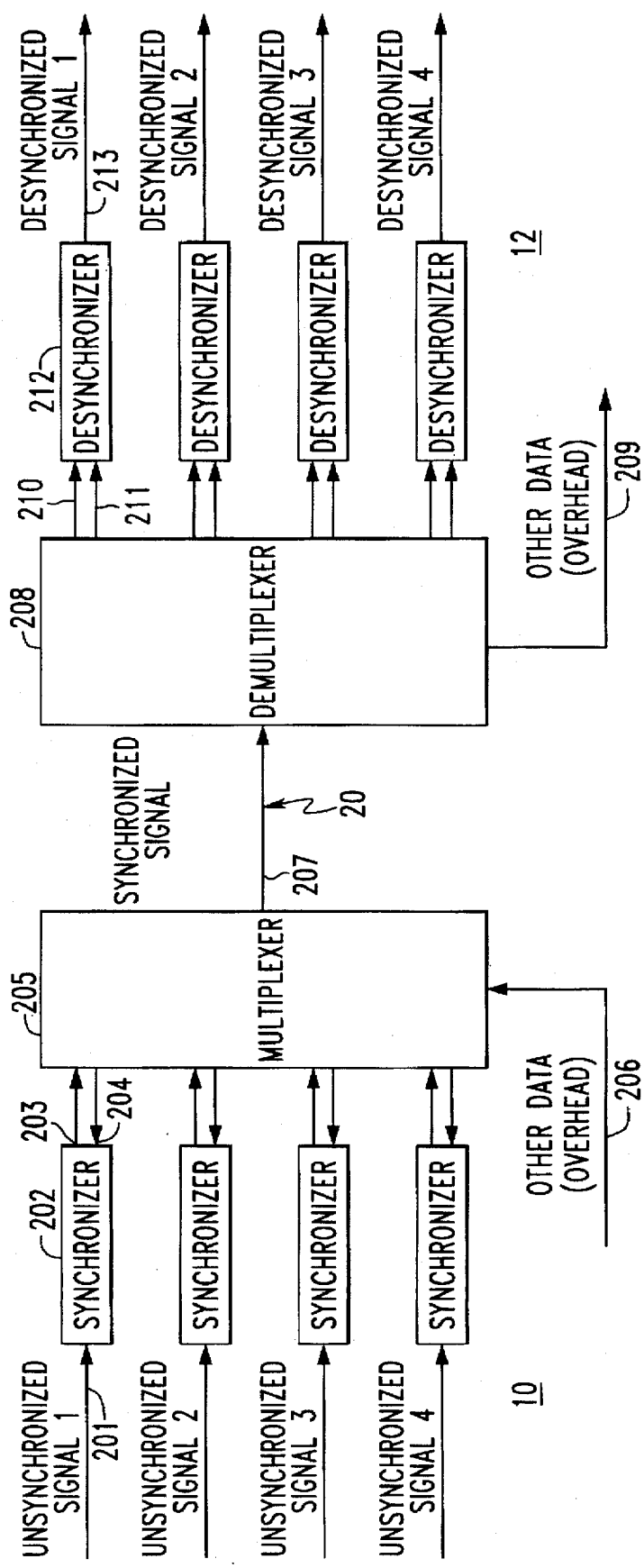
FIG. 1 is a diagrammatic illustration of a digital data communication system employing multiplexing and pulse stuffing synchronization.
Figure 2:
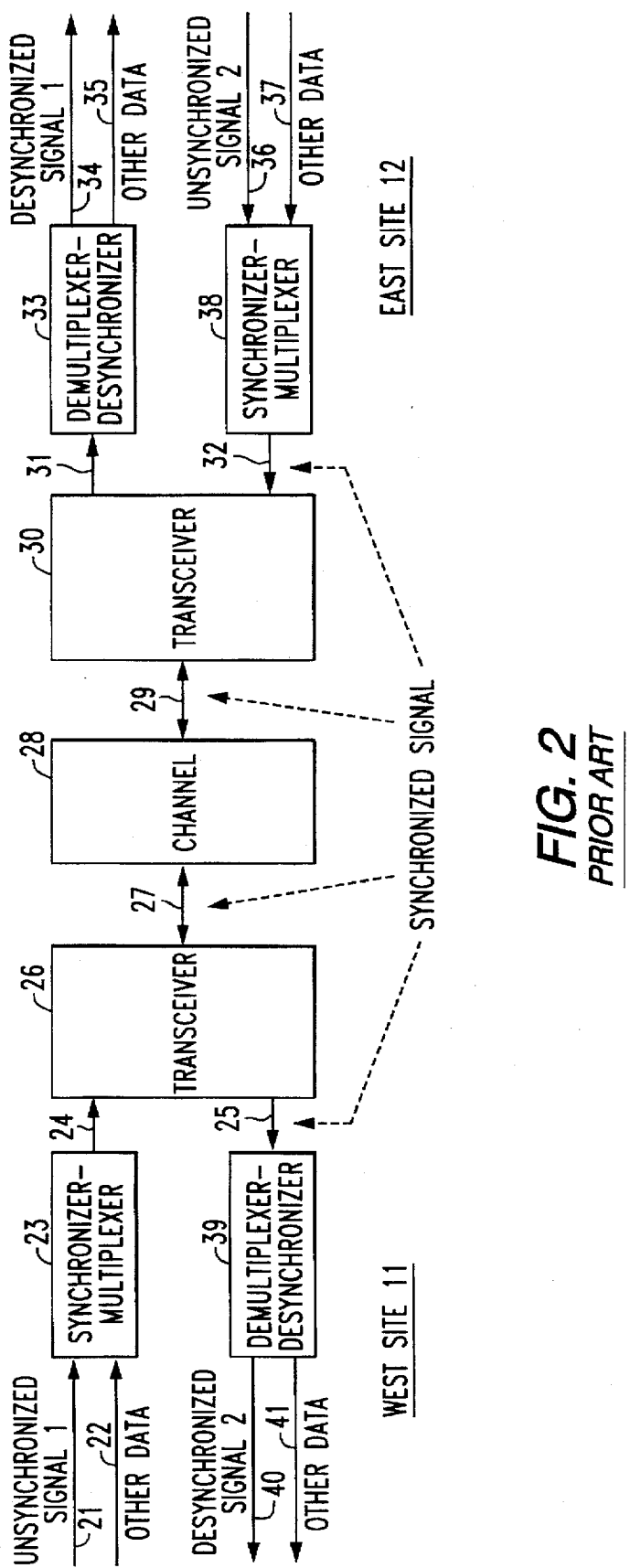
FIG. 2 is a diagrammatic illustration of a full-duplex digital data communication system which employs pulse stuffing synchronization.

Before describing in detail the new and improved accumulated phase error-based wander reduction mechanism for use in an HDSL pulse-stuffing synchronization system in accordance with the present invention, it should be observed that the invention resides primarily in what is effectively a prescribed digital signal processing technique that may be implemented by means of conventional digital communication and signal processing circuit components. Consequently, the manner in which such circuit components are interfaced with one another has been illustrated in the drawings in readily understandable block diagram format, which show only those specific details that are pertinent to the present invention, so as not to obscure the disclosure with details which will be readily apparent to those skilled in the art having benefit of the description herein. Thus, the block diagram illustrations are primarily intended to illustrate the major components of the system in a convenient functional grouping, whereby the present invention may be more readily understood.

As pointed out briefly above, in accordance with the present invention, a precise measure of the clock phase differential necessary for reducing wander is conveyed from the pulse-stuffing synchronization site to the pulse stuffing desynchronization site by storing the net effect of successive phase adjustments in a phase adjustment accumulator over a prescribed measurement period, encoding the stored value and transmitting the encoded phase accumulation information over the synchronous digital data communication channel to the receiver. Then, at the receiver, the encoded message is decoded, and the sequence accumulation information is used by the desynchronizer to generate a desynchronized data clock, that has the same number of net phase adjustments during a measurement period as the reference clock at the synchronizer.

Figure 3:
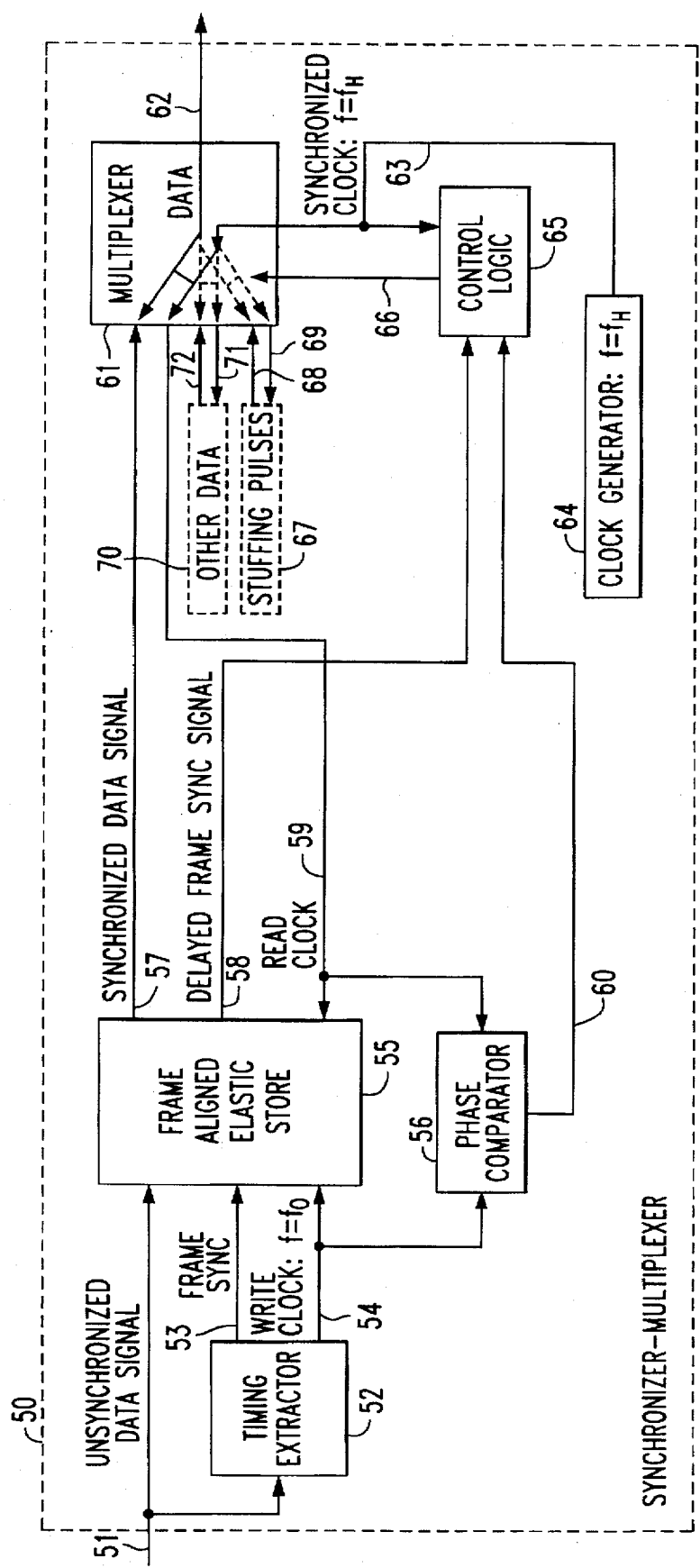
FIG. 3 is a diagrammatic illustration of a prior art synchronizer-multiplexer.
Figure 6:
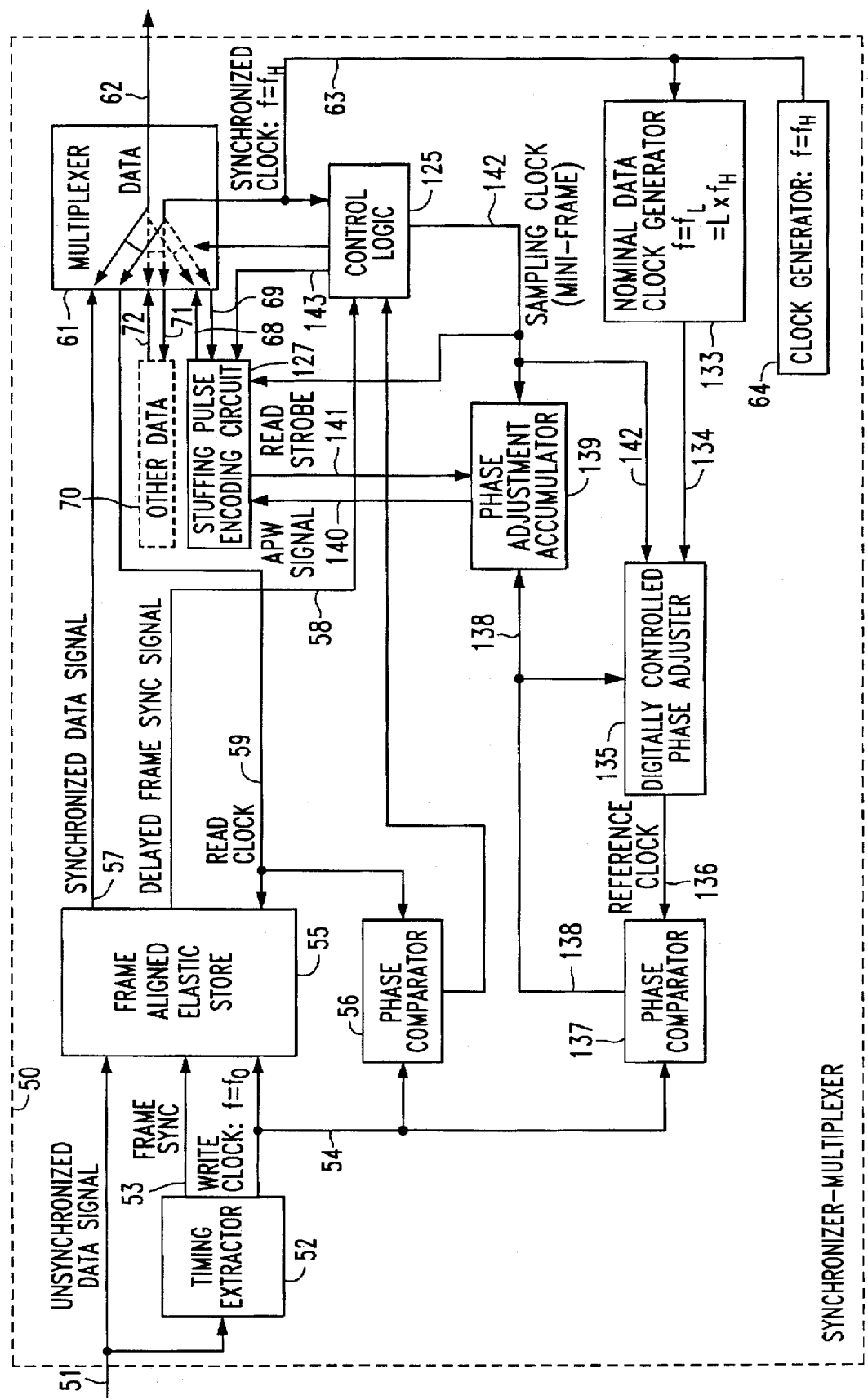
FIG. 6 is a diagrammatic illustration of an embodiment of a synchronizer-multiplexer of the present invention.

For this purpose, the synchronizer-multiplexer configuration of FIG. 3, described above, may be modified in the manner shown in FIG. 6 to include additional circuitry to reduce the jitter and wander of the pulse stuffing synchronization operation. In order to simplify the present text, a description of those components of FIG. 6 which are the same as those of FIG. 3 will not be repeated here. Instead the present description will concisely focus upon the modification of FIG. 3 contained in FIG. 6 and the operation of the resulting configuration.

More particularly, in the improved synchronizer-multiplexer configuration of FIG. 6, the write clock output link 54 from the timing extractor 52 is additionally coupled to a first input of an additional phase comparator 137, a second input of which is coupled to receive a reference clock on link 136. Phase comparator 137 outputs a binary signal on link 138, the logical value of which indicates whether a predefined edge (e.g. leading edge) of the write clock on link 54 precedes or follows a corresponding predefined edge (e.g. leading edge) of the reference clock on link 136.

The output of phase comparator 137 on link 138 is coupled to a digitally controlled phase adjuster 135 and to a digitally controlled phase adjustment accumulator 139, which sample the output of phase comparator 137 once per mini-frame in accordance with a sampling clock signal on link 142. The digitally controlled phase adjuster 135 advances or retards the phase of a nominal data clock on link 134 supplied by a nominal data clock generator 133, by one mini-stuff, once per mini-frame, according to the sampling clock signal on link 142. Nominal data clock generator 133 is coupled to multiply the synchronized clock on link 53 from sync clock generator 64 by a prescribed ratio (P/Q) and outputs a clock frequency $f_L=P/Q \times f_H$ on link 134. The ratio P/Q is representative of the ratio of nominal number of bits of the synchronized data signal on link 57 in a stuffing frame to the total nominal number of bits in a stuffing frame.

Digitally controlled phase adjuster 135 advances the phase of the reference clock 136 if the logical state of output link 138 from phase comparator 137 indicates that the prescribed edge of the write clock on link 54 precedes that of the reference clock on link 136. Conversely, it retards the phase of the reference clock 136 if the logical state of output link 138 from phase comparator 137 indicates that the prescribed edge of the write clock on link 54 lags or follows that of the reference clock on link 136. (It will be readily appreciated by those skilled in the art that the closed loop formed by digitally controlled phase adjustor 135 and phase comparator 137 establishes a digital phase locked loop.)

Phase adjustment accumulator 139 accumulates the binary values of the phase comparator output on link 138, once per mini-frame, according to the sampling-clock on link 142, produced by control logic unit 125. The contents of phase adjustment accumulator 139, termed an accumulated phase word (APW) signal, is sampled once per M-frame by a stuffing pulse encoding circuit 127, via link 140. When the APW data has been read, the accumulator 139 is notified via a read strobe pulse on link 141, which clears or resets the accumulator. Stuffing pulse encoding circuit 127 reads in an accumulated phase word signal on link 140 once per M-frame, encodes it, and transmits it via the stuffing pulse values during the following M-frame. Stuffing pulse encoding circuit 127 keeps the M-frame aligned to the stuffing frames and mini-frames via signals on links 143 and 142 respectively, from control logic unit 125.

The selection of the particular encoding format used by the stuffing pulse encoding circuit 127 (and the corresponding decoding circuitry at the receiver) is application dependent, and includes a consideration of factors such as total stuffing ratio range, usable stuffing frequency range, number of mini-frames per stuffing frame, bit error characteristics of the channel, and the frequency stability of input unsynchronized data signal and the internal synchronized clock generator.

Figure 9:
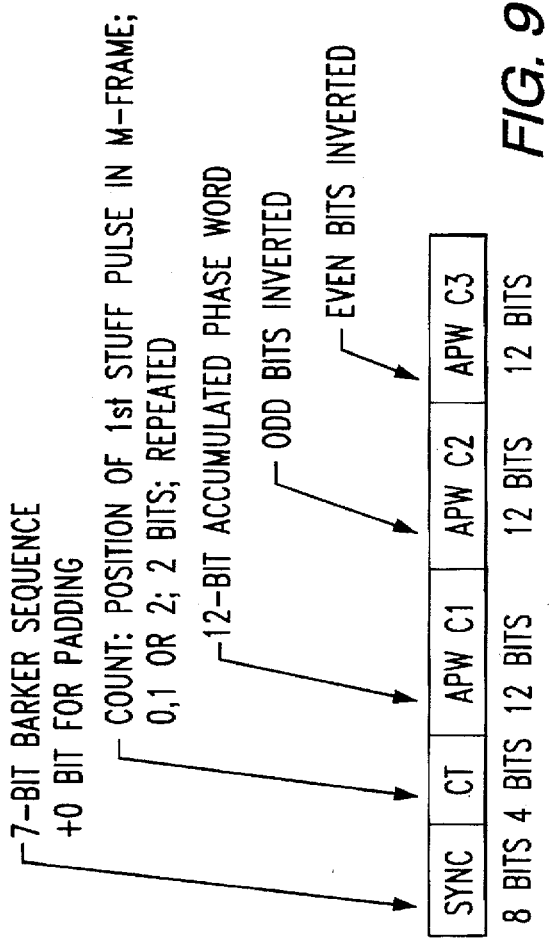
FIG. 9 shows a preferred encoded message format according to the present invention.

A non-limiting example of a suitable encoding format for an HDSL DS1 application is illustrated in FIG. 9. As shown, each stuffing pulse carries 4 bits of information. In the illustrated example, N2=36 and N3=12, which allows the use of a 48 bit message. The message includes a framing sequence, and three copies of the accumulated phase word (12 bits each) which are successively altered to distinguish between each copy and to assist in the detection of framing. Three copies of the accumulated phase word are included in the message to provide redundancy and resistance to bit errors. The copies are separated by a minimum of a stuffing frame, which helps to reduce the probability that a single error event would cause all copies of the message to be received in error. If more resistance to errors is required, an error correcting code may be employed in place of encoding format of FIG. 9.

Figure 4:
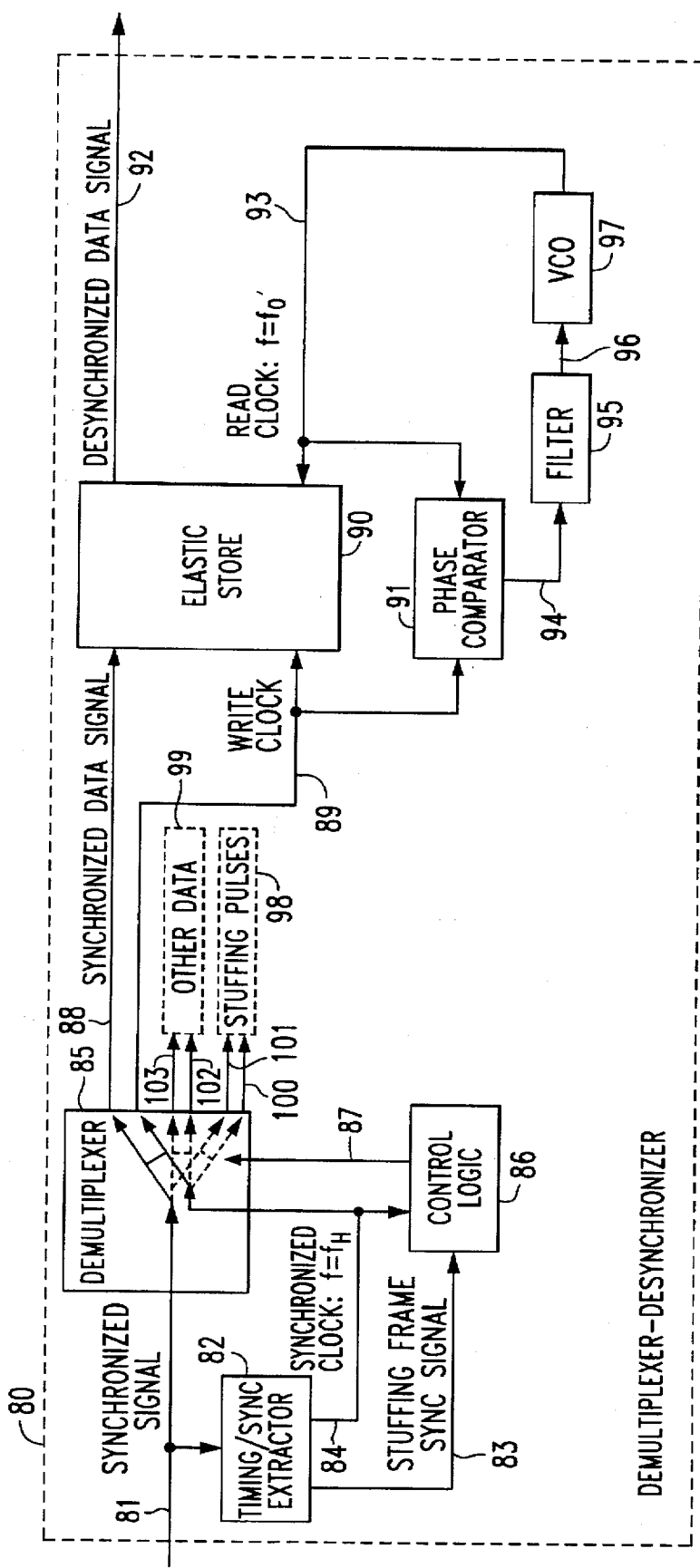
FIG. 4 is a diagrammatic illustration of a prior art demultiplexer-desynchronizer.
Figure 5:
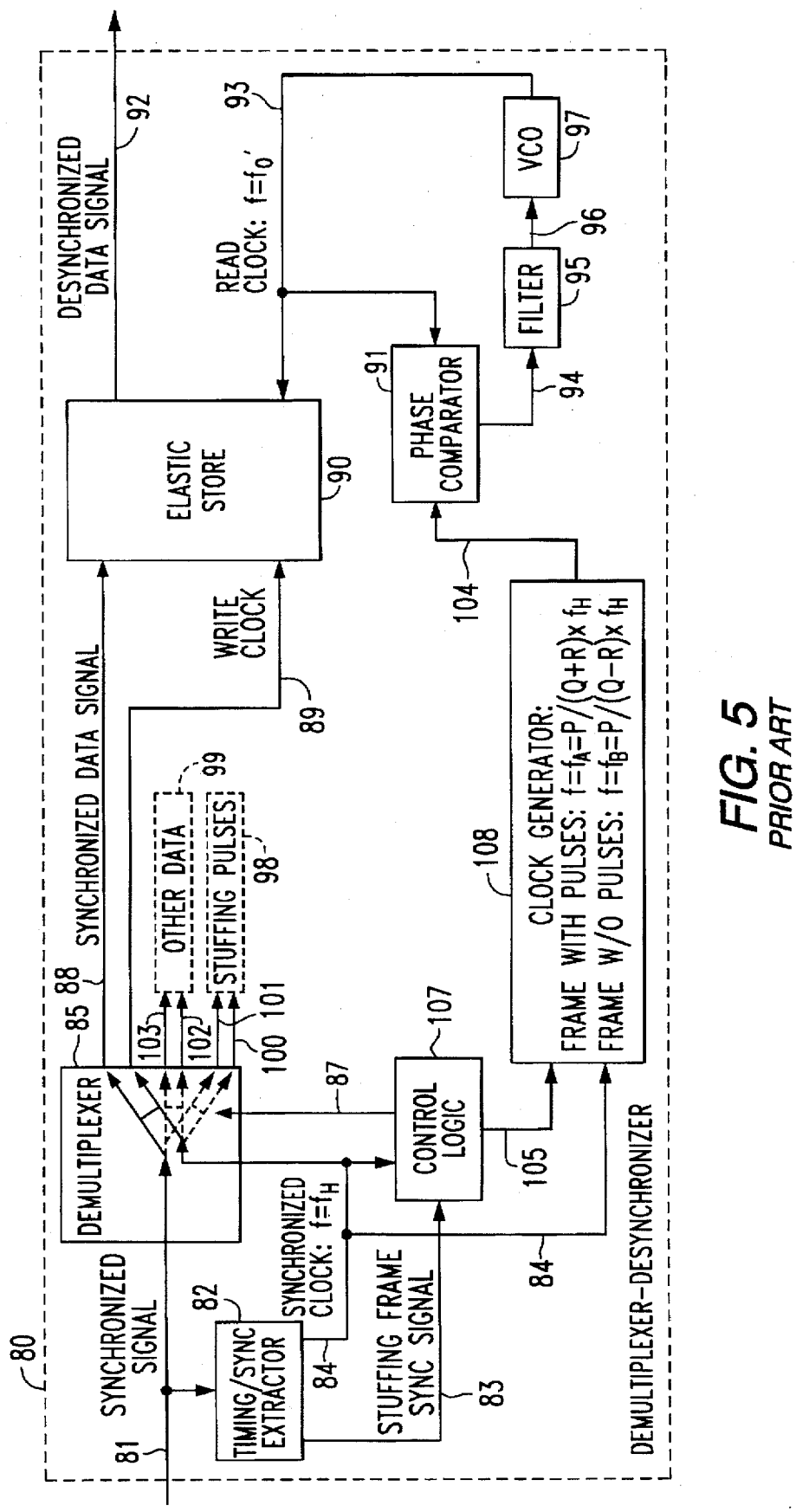
FIG. 5 is a diagrammatic illustration of modification of the prior art demultiplexer-desynchronizer of FIG. 4.
Figure 7:
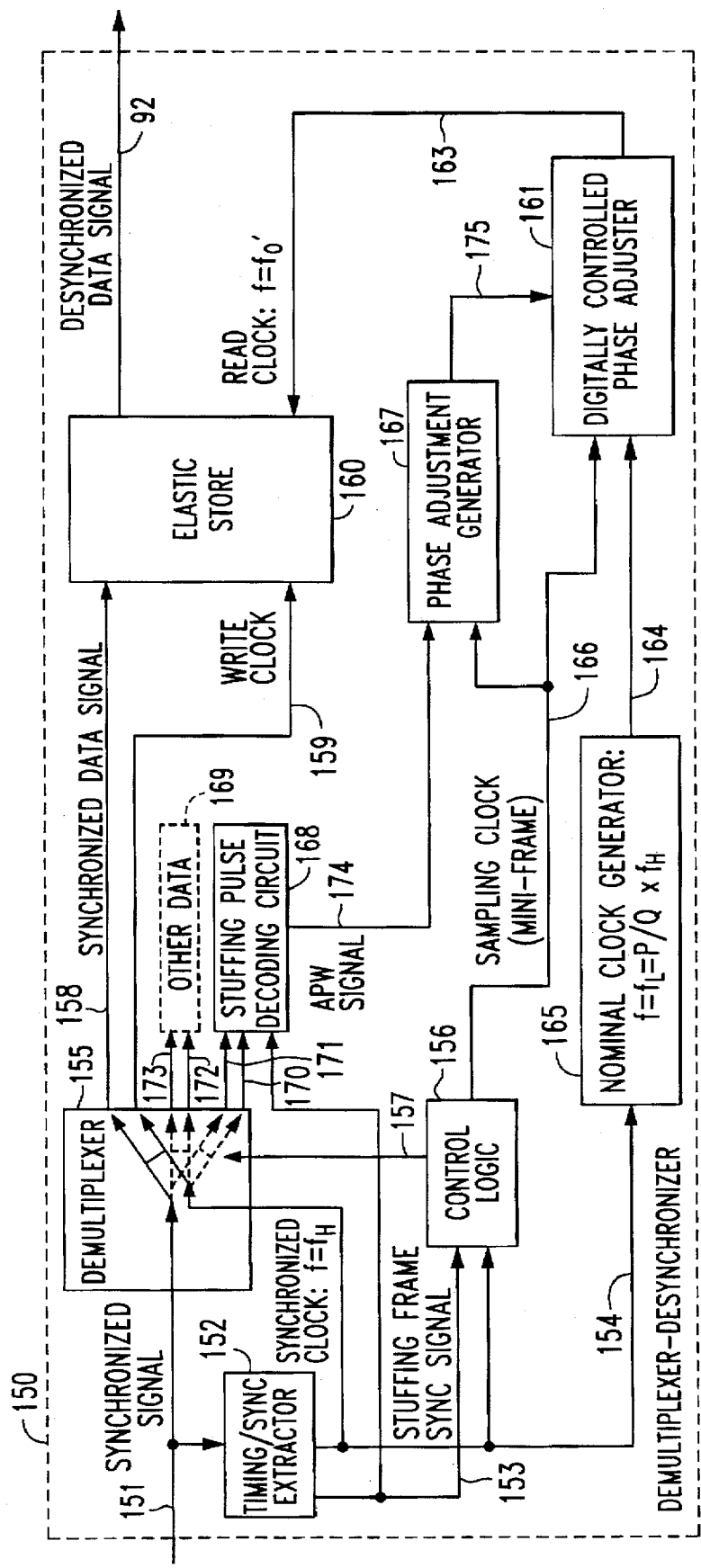
FIG. 7 is a diagrammatic illustration of an embodiment of a demultiplexer-desynchronizer of the present invention.

FIG. 7 shows the manner in which the desynchronizer-demultiplexer configuration of FIGS. 4 and 5, described above, may be modified to accommodate the additional functionality of the enhanced synchronizer-multiplexer of FIG. 6.

In the improved desynchronizer-demultiplexer configuration of FIG. 7, the received synchronized signal 151 is coupled to the a timing/sync extractor 152 and to a demultiplexer 155. Timing/sync extractor 152 recovers the synchronized clock (sync clock $f=f_H$) on sync clock line 154 to a control logic unit 156, to demultiplexer 155 and to a nominal clock generator 165. Timing/sync extractor 152 also provide a stuffing frame sync (synchronization) signal on link 153 to a stuffing pulse decoding circuit 168, and to control logic 156. Control logic unit 156 employs the stuffing frame sync signal in conjunction with the synchronized clock 154 to provide a control signal on link 157 to demultiplexer 155.

The control signal on link 157 directs the demultiplexer 155 to switch the incoming data 151 and clock 154 lines between one of three possible outputs: 1—a synchronized data signal 158 and an associated write clock 159, 2—another data signal 173 and an associated write clock 172, and 3—an input data signal to stuffing pulse decoding circuit 168 and an associated write clock 170. The synchronized data signal on link 158 is input to elastic store 160 using write clock 159.

A desynchronized signal 92 is output from the elastic store 160 using the read clock on read clock link 163. The read clock signal on link 163 is generated by a digitally controlled phase adjuster 161, which modifies the phase of the nominal clock output by nominal clock generator 165 on link 164. The nominal clock $f_L$ produced by nominal clock generator 165 is synchronously related to the synchronized clock on sync clock link 154. The clock frequency $f_L$ is related to the synchronized clock frequency $f_H$ by a fixed fractional relationship ($f_H=P/Q \times f_L$), which is represented by the ratio of nominal number of bits of the synchronized data signal on demultiplexer output link 158 in a stuffing frame to the total nominal number of bits in a stuffing frame.

As will be described in detail below with reference to FIG. 8, digitally controlled phase adjuster 161 produces the read clock signal on link 163 by modifying the phase of the nominal clock signal on link 164 according to a binary or ternary phase adjustment signal 175 output by a phase adjustment generator 167, with the phase adjustments occurring once per mini-frame according to the sampling clock on link 166 from control logic unit 156. The sampling clock signal on link 166 is also used by the phase adjustment generator 167 (shown in detail in FIG. 8), which receives an accumulated phase word (APW) on link 174 from stuffing pulse decoding circuit 168, and converts it into a sequence of binary or ternary values, which it outputs as the phase adjustment signal on link 175.

The stuffing pulse decoding circuit 168 receives stuffing pulses which carry an encoded version of the accumulated phase word. This circuit, which must recover M-frame sync from the encoded stuffing pulses that it receives, also receives the stuffing frame sync signal on link 153 from timing/sync extractor as an input, so that it can keep track of whether a stuffing frame includes stuffing pulses or not. The output of the stuffing pulse decoding circuit 168 on link 174 is the accumulated phase word, which may change in value every M-frame.

Figure 8:
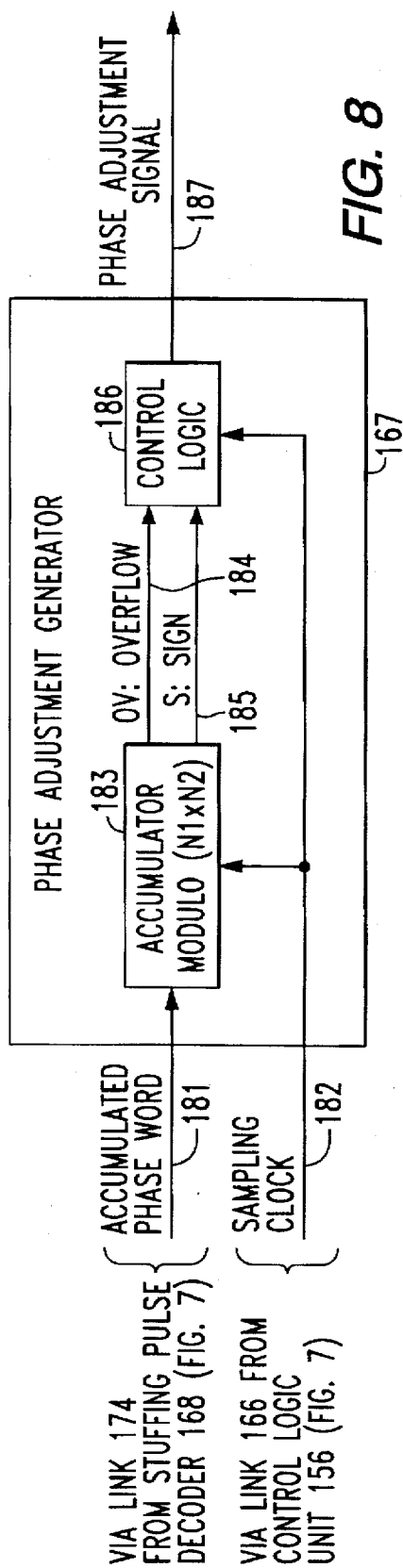
FIG. 8 is a diagrammatic illustration of the phase adjustment generator of the demultiplexer-desynchronizer of FIG. 7.

Phase adjustment generator 167 is shown in detail in FIG. 8 as comprising an accumulator 183 and a control logic circuit 186, which are operative to output a new ternary value on link 187 every period of the sampling clock 182 (via link 166 from control logic unit 156 in FIG. 7). Accumulator 183 accumulates the accumulated phase word signal 181 (via link 174 from stuffing pulse decoding circuit 168 in FIG. 7) once per mini-frame, according to the sampling clock on link 182. Accumulator 183 operates in modulo (N1×N2), signaling an overflow condition via a binary overflow (OV) signal on link 184 when its contents roll over/under or wrap around. The direction of the wrapping is indicated via the binary sign signal (S) on link 185. Control logic unit 186 takes combines the overflow (OV) signal on link 184 and the sign (S) signal on link 185 to form a ternary output on link 187 (corresponding to link 175 in FIG. 7) according to the following relationship, where (OV=1, S=0) indicates a positive overflow; (OV=1, S=1) indicates a negative overflow or underflow:

$$Output = (-1)^S \times OV$$

which results in the ternary output signal taking on the values of −1, 0 or +1.

As described above, this ternary value is coupled to digitally controlled phase adjuster 161, which modifies the phase of the nominal clock output by nominal clock generator 165 on link 164 and couples the modified clock as a read clock $f=f_0'$ on read clock link 163, so as to control the generation of the desynchronized signal 162 from the elastic store 160 over link 92.

As will be appreciated from the foregoing description, the requirement for a wander reduction mechanism in an HDSL pulse-stuffing synchronization system is satisfied in accordance with the present invention by providing a more precise measure of the phase of the incoming asynchronous signal than is obtained in conventional schemes (in which the only information available is the presence or absence of stuffing pulses). As detailed in the foregoing, this precise measure of the phase is transmitted to the desynchronizer at the receiver by using the values of the stuffing pulses to convey the needed information. By adding an auxiliary phase comparator and phase adjuster in the synchronizer-multiplexer to generate a reference data clock (derived from the synchronized data clock), the incoming unsynchronized data clock can be tracked. As the clock is iteratively phase-adjusted, a running total of the respective changes is maintained, so that the net number of adjustments may be encoded and transported over the synchronous digital data communication channel to the receiver. By decoding this sequence information, at the receiver, the desynchronizer is able to generate a desynchronized data clock that has the same number of net phase adjustments during a measurement period as the reference clock at the synchronizer.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method for reducing the jitter and wander of a data signal that is passed through a pulse stuffing synchronizer and desynchronizer, said method comprising the steps of:
   (a) sequentially adjusting the phase of a reference clock signal so as to cause said reference clock signal to closely track the phase of a clock signal recovered from said data signal;
   (b) storing information representative of the net effect of phase adjustments of said reference clock in step (a);
   (c) conveying said net effect representative information stored in step (b) to said desynchronizer;
   (d) generating a sequence of phase adjustments in accordance with said net effect information; and
   (e) generating a clock signal for controlling the operation of said desynchronizer in accordance with said sequence of phase adjustments generated in step (d).

2. A method according to claim 1, wherein step (a) comprises:
   (a1) generating said reference clock signal,
   (a2) comparing the phase of said reference clock signal with that of said recovered clock signal and generating a phase difference signal representative of whether or not said recovered clock signal leads or lags said reference clock signal, and
   (a3) incrementally adjusting the phase of said reference clock signal in accordance with said phase difference signal.

3. A method according to claim 2, wherein step (b) comprises accumulating values of incremental phase adjustments of said reference clock signal over a prescribed measurement interval to derive said net effect of phase adjustments of said reference clock, and storing information representative of said net effect.

4. A method according to claim 3, wherein step (c) comprises encoding said net effect representative information stored in step (b) and conveying said encoded information to said desynchronizer.

5. A method according to claim 4, wherein step (d) comprises decoding said encoded information conveyed to said desynchronizer, and generating therefrom a sequence of phase adjustments, and wherein step (e) comprises:
   (e1) generating a clock signal for controlling the operation of said desynchronizer, and
   (e2) incrementally adjusting the phase of said clock signal for controlling the operation of said desynchronizer in accordance with said sequence of phase adjustments generated in step (d).

6. A method according to claim 5, wherein step (d) comprises generating said sequence of phase adjustments in accordance with successive results of iteratively performing a prescribed logic operation on said decoded information.

7. A method according to claim 6, wherein said prescribed logic operation produces a ternary output signal having values respectively associated with an incremental increase in, an incremental decrease in, or no change in the phase of said clock signal for controlling the operation of said desynchronizer.

8. A method according to claim 7, wherein said prescribed logic operation produces a ternary output signal having values of −1, 0 or +1.

9. A system for reducing the jitter and wander of a data signal that is passed through a pulse stuffing synchronizer at a transmit site, conveyed over a digital data communication link to a receive site, and recovered by a desynchronizer at said receive site, said system comprising:
   at said transmit site,
   a timing signal extractor which is operative to recover a clock signal contained in said data signal;
   a reference clock generator which generates a reference clock signal;
   a phase adjuster which is operative to sequentially adjust the phase of said reference clock signal so as to cause said reference clock signal to track the phase of said clock signal recovered from said data signal;
   a phase adjustment accumulator which stores information representative of the net effect of sequential phase adjustments of said reference clock by said phase adjuster; and a pulse stuffer which is operative to controllably insert into digital data stream to be conveyed over said digital data communication link to said receive site, stuffing pulses and signals containing said information stored by said phase adjustment accumulator.

10. A system according to claim 9, further including, at said receive site, a stuffing pulse decoder which is operative to derive said net effect representative information signals contained in said digital data stream;

a phase adjustment generator which is operative to generate a sequence of phase adjustments in accordance with said net effect representative information signals; and a controlled clock signal generator which is operative to generate a clock signal for controlling the operation of said desynchronizer in accordance with said sequence of phase adjustments generated by said phase adjustment generator.

11. A system according to claim 9, wherein, at said transmit site, said phase adjuster includes a phase comparator which is operative to compare the phase of said reference clock signal with that of said recovered clock signal and generates a phase difference signal representative of whether or not said recovered clock signal leads or lags said reference clock signal, and a digitally controlled phase adjuster which incrementally adjusts the phase of said reference clock signal in accordance with said phase difference signal, and thereby cause said reference clock signal to track the phase of said clock signal recovered from said data signal.

12. A system according to claim 9, wherein, at said transmit site, said phase adjustment accumulator is operative to accumulate values of incremental phase adjustments of said reference clock signal over a prescribed measurement interval to derive said net effect of phase adjustments of said reference clock, and stores information representative of said net effect.

13. A system according to claim 12, wherein, at said transmit site, said pulse stuffer is operative to insert into said digital data stream to be conveyed over said digital data communication link to said receive site, encoded information stored by said phase adjustment accumulator.

14. A system according to claim 13, wherein, at said receiver site, said stuffing pulse decoder is operative to decode said encoded information net effect representative information signals contained in said digital data stream, and wherein said phase adjustment generator is operative to generate said sequence of phase adjustments in accordance with the decoded net effect representative information signals.

15. A system according to claim 14, wherein said phase adjustment generator is operative to generate a sequence of phase adjustments in accordance with successive results of iteratively performing a prescribed logic operation on said decoded information.

16. A system according to claim 15, wherein said prescribed logic operation produces a ternary output signal having values respectively associated with an incremental increase in, an incremental decrease in, or no change in the phase of said clock signal for controlling the operation of said desynchronizer.

17. A system according to claim 16, wherein said prescribed logic operation produces a ternary output signal having values of −1, 0 or +1.

18. A method for reducing the jitter and wander of a data signal that is passed through a pulse stuffing synchronizer at a transmit site and transmitted over a digital data communications channel to a desynchronizer at a receive site, said method comprising the steps of:

at said transmit site, (a) sequentially adjusting the phase of a reference clock signal so as to cause said reference clock signal to closely track the phase of a clock signal recovered from said data signal;

(b) storing information representative of the net effect of phase adjustments of said reference clock in step (a); and (c) encoding signals representative of said net effect representative information stored in step (b) for transmission to said desynchronizer at said receiver site.

19. A method according to claim 18, further including, at said receive site, (d) decoding signals representative of said net effect information and generating a sequence of phase adjustments in accordance with said net effect information; and (e) generating a clock signal for controlling the operation of said desynchronizer in accordance with said sequence of phase adjustments generated in step (d).

20. A method according to claim 18, wherein step (a) comprises:

(a1) generating a reference clock signal, (a2) comparing the phase of said reference clock signal with that of said recovered clock signal and generating a phase difference signal representative of whether or not said recovered clock signal leads or lags said reference clock signal, and (a3) incrementally adjusting the phase of said reference clock signal in accordance with said phase difference signal.

21. A method according to claim 20, wherein step (b) comprises accumulating values of incremental phase adjustments of said reference clock signal over a prescribed measurement interval to derive said net effect of phase adjustments of said reference clock, and storing information representative of said net effect.

22. A method according to claim 21, wherein step (c) comprises encoding said net effect representative information stored in step (b) and conveying said encoded information to said desynchronizer.

23. A method according to claim 22, wherein step (d) comprises decoding said encoded information conveyed to said desynchronizer, and generating therefrom a sequence of phase adjustments, and wherein step (e) comprises:

(e1) generating a clock signal for controlling the operation of said desynchronizer, and (e2) incrementally adjusting the phase of said clock signal for controlling the operation of said desynchronizer in accordance with said sequence of phase adjustments generated in step (d).

24. A method according to claim 23, wherein step (d) comprises generating said sequence of phase adjustments in accordance with successive results of iteratively performing a prescribed logic operation on said decoded information.

25. A method according to claim 24, wherein said prescribed logic operation produces a ternary output signal having values respectively associated with an incremental increase in, an incremental decrease in, or no change in the phase of said clock signal for controlling the operation of said desynchronizer.

26. A method according to claim 25, wherein said prescribed logic operation produces a ternary output signal having values of −1, 0 or +1.

27. A demultiplexer-desynchronizer arrangement for a receive site of a communication system, said receive site being coupled to receive a digital data stream conveyed over a data communication link from a transmit site, said digital data stream including stuffing pulses that have been inserted at said transmit site and signals containing information representative of the net effect of sequential phase adjustments of a reference clock by a controlled phase adjuster at said transmit site, said arrangement comprising:

- a stuffing pulse decoder which is operative to derive said net effect representative information signals contained in said digital data stream;
- a phase adjustment generator which is operative to generate a sequence of phase adjustments in accordance with said net effect representative information signals; and
- a controlled clock signal generator which is operative to generate a clock signal for controlling the operation of said desynchronizer in accordance with said sequence of phase adjustments generated by said phase adjustment generator.

28. An arrangement according to claim 27, wherein said stuffing pulse decoder is operative to decode said encoded information net effect representative information signals contained in said digital data stream, and wherein said phase adjustment generator is operative to generate said sequence of phase adjustments in accordance with the decoded net effect representative information signals.

29. An arrangement according to claim 28, wherein said phase adjustment generator is operative to generate a sequence of phase adjustments in accordance with successive results of iteratively performing a prescribed logic operation on said decoded information.

30. An arrangement according to claim 29, wherein said prescribed logic operation produces a ternary output signal having values respectively associated with an incremental increase in, an incremental decrease in, or no change in the phase of said clock signal for controlling the operation of said desynchronizer.

31. An arrangement according to claim 30, wherein said prescribed logic operation produces a ternary output signal having values of −1, 0 or +1.

* * * * *